Patented Mar. 4, 1947

2,416,956

UNITED STATES PATENT OFFICE 2,416,956

SEPARATION OF TRYPTOPHANE FROM MIXED AMINO ACIDS

Melville Sahyun, Detroit, Mich., assignor, by mesne assignments, to Sterling Drug Inc., New York, N. Y., a corporation of Delaware No Drawing. Application April 6, 1943, Serial No. 482,071

2 Claims. (Cl. 260—319)

The present invention relates to the preparation of tryptophane and is particularly directed to a method for recovering tryptophane from aqueous solutions comprising mixtures of amino-acids.

The amino-acid tryptophane has previously been obtained as a breakdown product of protein. The recognized procedure for its production and isolation comprises the tryptic digestion of protein, treatment of the mixed digestion products with mercuric sulfate and sulfuric acid to form a complex salt, and decomposition of this salt with hydrogen sulfide to obtain the desired compound. The cost of such procedure is prohibitive, and furthermore, other amino-acids present in the crude protein digestion mixture are not conveniently recoverable in such form as to be of any practical value.

Recent investigations have established the importance of tryptophane as a nutritional element. It has been demonstrated that the maintenance of animals on a diet deficient in tryptophane is conducive to the development of cataract with subsequent loss of sight and, in many instances, the death of the subject. Such being the case, the fortification and enrichment of foods low in tryptophane becomes very desirable. The high cost of preparation and difficulties attendant upon the separation and isolation of tryptophane has largely prevented such development on any appreciable scale, and improved and more economical procedures for assuring an adequate supply of the compound are desirable.

It is among the objects of the present invention to provide an improved method for the separation of tryptophane from aqueous solutions of mixed amino-acids. It is a further object to provide a method for isolating tryptophane in substantially pure form. An additional object contemplates the provision of an improved method for accomplishing the hydrolysis and digestion of protein to obtain hydrolysates rich in tryptophane. A still further object is to make available a method for the separation of tryptophane from the digestion products of protein which will permit the maximum utilization of other amino-acids formed in the process. Other objects will become apparent from the following specification and claims.

According to the present invention, tryptophane is recovered from an aqueous solution comprising mixed amino-acids by contacting such solution at relatively low temperatures with activated carbon and thereafter extracting the carbon adsorbate with a solvent for the tryptophane.

In carrying out such operation, the amino-acid solution is acidified and contacted with the activated carbon at a relatively low temperature in order that the tryptophane be adsorbed by the latter. An acidified solution of a mixture of amino-acids is preferred because of its ease of filtration in contrast with substantially neutral or alkaline solutions thereof. The extraction of the carbon adsorbate and recovery of tryptophane are carried out under alkaline conditions.

The source of the mixed amino-acids herein employed and the manner of their preparation are not critical provided only that tryptophane be included therein. However, it has been observed that the hydrolysis of proteins with acid completely destroys the tryptophane molecule so that the use of a product obtained by the hydrolysis of a protein with alkali or by the action of proteolytic enzymes is preferred. In fact, the present invention embodies a complete method for the preparation and isolation of tryptophane including the hydrolysis of protein by the action of proteolytic enzymes and subsequent treatment of the hydrolysate to recover a major portion of the tryptophane formed.

In operating in accordance with such procedure, a suitable protein material is dispersed in water and adjusted to the pH, generally between 5.0 and 8.5, at which optimum action of the selected enzyme is obtained. A suitable preservative, e. g., carbon tetrachloride or toluene, may be added to the mixture at this point if desired, although not necessarily. The selected proteolytic enzyme is then added and the mixture incubated at a suitable temperature, e. g., 37°–40° C., for the period of time necessary to accomplish the desired hydrolysis, generally from 7 to 15 days. Additional alkali may be added to the mixture from time to time during the incubation period to maintain the pH of the mixture within the desired range. Similarly additional enzyme and/or peptidases may be added from time to time if desired to accomplish a more rapid and nearly complete breakdown of the original protein material to amino-acids.

When the desired degree of hydrolysis is obtained, the mixture may be heated to 80°–90° C. if desired, although not necessarily. In any event, the crude hydrolysate product is made acid and filtered to remove undigested and insoluble materials. An optional but desirable operation following filtering consists of treating the filtrate hot with activated carbon to accomplish a removal of undesirable coloring matter, undigested protein, and a portion of the tyrosine present. Such treatment of the hydrolysate at elevated temperatures with activated carbon removes very little of the tryptophane. The acidified hydrolysate, whether or not subjected to the clarification operation, is then cooled, preferably to about room temperature or below, and contacted with activated carbon whereupon a high proportion of the tryptophane therein is adsorbed by the carbon. The carbon adsorbate is then removed from the body of the aqueous mixture by filtration or otherwise, and extracted under alkaline conditions with a solvent for tryptophane to obtain a solution rich in the latter.

If desired the solution as obtained by the elution of the carbon adsorbate may be further processed to obtain the tryptophane in more concentrated form or as pure crystalline compound by subjecting the extract to successive reductions in volume and fractional crystallizations. In one such operation, the eluate is partially evaporated or is fractionally distilled to recover a portion of the solvent, and the residue cooled to crystallize out impurities consisting principally of tyrosine. The mixture is then filtered, the filtrate further reduced in volume by evaporation, fractional distillation, etc., and diluted with an excess of an at least partly water miscible organic solvent such as a lower aliphatic alcohol. The resulting product is cooled and filtered to separate further precipitated impurities. The filtrate is again processed to remove the major portion of the solvent and recover a liquid residue, which, upon filtration, consists of a clear solution containing a high concentration of tryptophane and but traces of such impurities as peptides, methionine, leucine, arginine, and phenyl alanine. This solution is adapted to be employed after sterilization, if desired, for the fortification of protein hydrolysates or food products deficient in tryptophane, or for any other desired purpose.

Where it is wished to isolate pure tryptophane, the final solution, as described above, may be extracted with suitable organic solvent, and the extract concentrated by evaporation under reduced pressure to obtain crystalline tryptophane.

The filtrate obtained from the treatment with carbon of the cold mixed amino-acid solution, as described above, contains all of the amino-acids in usable form including an adequate amount of tryptophane. This product may be concentrated and additional tryptophane or other amino-acids isolated therefrom, or may be utilized for nutritional purposes.

Any suitable protein may be employed in the digestion procedure as described, e. g., casein, lactalbumin, globulin, albumin, liver proteins, muscle proteins, etc. Because of availability on a commercial scale and cheapness, casein is preferred.

Suitable enzymes include raw pancreas, commercial trypsin, trypsin, erepsin, papain, etc. The optimum pH conditions for carrying out the hydrolysis vary from 5.0–5.5 for papain, to 7.5–7.7 for erepsin, and 8.0–8.2 for raw pancreas and commercial trypsin. The preferred pH range of operation is between 7 and 8.5.

A wide variety of alkalies are operable in connection with the various pH adjusting and neutralizing operations as described, including calcium oxide, sodium hydroxide, potassium hydroxide, ammonium hydroxide, barium hydroxide, sodium carbonate, etc. Similarly, any suitable acid such as oxalic acid, sulfuric acid, hydrochloric acid, or acid salts is suitable. However, in order that the final product be not contaminated with excessive amounts of potentially undesirable inorganic salts, the use of calcium oxide and oxalic acid constitute a preferred embodiment of the invention, by reason of the fact the calcium oxalate formed upon acidification of the crude hydrolysate prior to adsorption of tryptophane on the activated carbon is so insoluble as to be removed almost quantitatively by filtration. It is to be understood however that other alkalies and acids forming insoluble salts are also operable, as well as such reagents as sodium hydroxide and hydrochloric acid, since the presence of small amounts of sodium chloride in the final product is not particularly objectionable.

Any suitable solvent may be employed in connection with the present invention. In the elution of the carbon adsorbate, even hot water can be utilized with a measure of success. Organic solvents are preferred, and particularly at least partly water-miscible compounds such as the lower aliphatic alcohols, e. g., methyl alcohol, ethyl alcohol, propyl alcohol, isopropyl alcohol, isobutanol, butanol, etc. Other solvents which have been found operable include acetone, dioxan, and the like. In those operations where a substantial separation from water is desired, the preferred extractant is isobutyl alcohol or other difficultly water-miscible solvent.

In carrying out the extraction or elution of the carbon adsorbate the solvent is preferably used hot, although not necessarily. In this step the alkaline condition of operation may be accomplished either by dissolving alkaline reacting material in the solvent or by dispersing it in the carbon adsorbate. The condition of alkalinity is critical, as little or no tryptophane is recovered by operation under neutral or acid conditions. The actual extraction may be carried out by dispersing and mixing the carbon adsorbate in an excess of solvent, or by recirculating a minimum amount of solvent in contact with the carbon adsorbate until the desired degree of extraction is obtained.

Similarly, the exact mechanism whereby the activated carbon is contacted with the original crude hydrolysate is not critical provided only that the mixture be definitely acid during the operation, and that the temperature of the mixture be not greatly above about 30° C. A temperature approaching freezing is preferable as it enhances the rate of adsorption of tryptophane on activated charcoal.

While the foregoing description and following example are directed largely to a complete process for the hydrolysis of protein by the action of proteolytic enzymes and subsequent recovery of tryptophane, it is to be understood that the product obtained by the alkaline hydrolysis of protein, or any other tryptophane containing solution of whatever source, may be similarly subjected to the basic invention of treatment with activated carbon followed by elution of the carbon adsorbate to recover tryptophane. The following example is illustrative only.

*Example*

100 kilograms of casein and 2 kilograms of calcium oxide were dispersed in 175 gallons of lukewarm water, and the mixture continuously stirred for 2 hours. At the end of this time the pH of the mixture was adjusted to approximately 8.2 with additional calcium oxide. 1 liter of chloroform and 1 liter of toluene were then added to the mixture as preservatives, and 500 grams of commercial trypsin dispersed therein. The mixture was then incubated at a temperature of 37°–40° C. At the end of 5 days' incubation, an additional 500 grams of trypsin was stirred into the product and incubation continued. Throughout this period small additional amounts of calcium oxide were intermittently added to the mixture to maintain therein a pH of approximately 8.0.

The resulting tryptic hydrolysate product was heated to 80°–90° C. and oxalic acid added thereto with stirring until the solution gave only a slight reaction for calcium and had a pH of 5.0–5.3. The acidified mixture was allowed to stand to provide for the settling out of calcium oxalate, unhydrolyzed casein, and insoluble products of reaction. The liquid component of the mixture was then decanted from the sludge, filtered, heated to a temperature of approximately 80° C., and 1 kilogram of activated carbon mixed therewith. The hot mixture was immediately filtered to obtain a clear solution from which most of the coloring matter and appreciable amounts of tyrosine were removed along with the activated carbon.

Approximately 21 kilograms of activated carbon was then stirred into the straw-colored filtrate and the mixture stirred and cooled for 12–16 hours at a temperature below 10° C. The cooled product was then filtered and the moist carbon adsorbate washed with cold distilled water and stirred into 100 gallons of ethyl alcohol previously modified with sufficient sodium hydroxide to provide for an alkaline pH in the resulting carbon dispersion. This alcoholic mixture was then heated to boiling, stirred for about 30 minutes, and filtered hot. The charcoal residue from the filtration was eluted twice with 50 gallon portions of hot alkaline reacting alcohol, and the several alcoholic eluates combined. This product was fractionally distilled to recover the major portion of the alcohol, and the aqueous residue cooled. A heavy precipitate consisting chiefly of tyrosine and some leucine was formed and removed by filtration. The filtrate was concentrated by evaporation under reduced pressure to 5–6 gallons volume. This product was then mixed with about 5 volumes of ethyl alcohol, and the mixture cooled and filtered to separate a gummy precipitate. The clear alcoholic filtrate was again fractionally distilled under reduced pressure to reduce the volume of the mixture to approximately 6 gallons of an aqueous solution containing 800–1000 grams of tryptophane. An analysis of this product showed it to contain, besides tryptophane, some peptides, methionine, leucine, arginine, and phenylalanine. This product is adapted without further treatment to be employed for the fortification of protein hydrolysate materials deficient in tryptophane, for the enrichment of foods, etc. For such purposes it is sterilized to prevent bacterial contamination.

In a further operation, a portion of the tryptophane solution as obtained above was extracted with isobutyl alcohol and the extract concentrated under reduced pressure to obtain crystalline tryptophane. Portions of this solid tryptophane product were recrystallized from ethyl alcohol and from isobutyl alcohol to obtain substantially chemically pure tryptophane.

The clear filtrate obtained in the initial separation of the carbon adsorbate from the crude hydrolysis mixture as described above, may be concentrated to give an amino-acid product sufficiently high in tryptophane and other protein hydrolysis products to be used for nutritional purposes. Such concentrated product, whether in the form of a solution, suspension, or dried residue, consists essentially of peptides and aminoacids.

I claim:

1. In a process for the preparation of tryptophane the steps which include: contacting at a temperature below about 30 degrees centigrade an aqueous solution of mixed amino acids containing tryptophane with sufficient activated carbon to adsorb a substantial proportion of the tryptophane; separating the carbon adsorbate; and, eluting the latter under alkaline conditions with an organic, partly water-miscible solvent for tryptophane.

2. In a process for the preparation of tryptophane from a protein hydrolysate the steps which include: contacting at a temperature below about 30 degrees centigrade an aqueous solution of a hydrolysate of mixed amino acids containing free tryptophane with sufficient activated carbon to adsorb a substantial proportion of the tryptophane; separating the carbon adsorbate; eluting the latter under alkaline conditions with an organic, partly water-miscible solvent having a greater solvent power for tryptophane than for the other amino acids of the said hydrolysate; and, recovering from the eluate a solution relatively richer in tryptophane by subjecting the eluate to successive reductions in volume and fractional crystallization to remove from the eluate hydrolysate products other than tryptophane.

MELVILLE SAHYUN.

REFERENCES CITED

The following references are of record in the file of this patent:

UNITED STATES PATENTS

| Number | Name | Date |
| --- | --- | --- |
| 2,180,637 | Kammerer | Nov. 21, 1939 |
| 2,241,927 | Sahyun | May 13, 1941 |

OTHER REFERENCES

Rogins, Chem. Abs., vol. 22, 1928, page 4541. (Copy in Patent Office Library.)

McCoy, Jr., Biol. Chem., vol. 112, 1936, pages 283, 286, 99–14 287. (Photostat in Div. 63.)

Chem. Abstracts, vol. 30, pages 4374–5. (Copy in Patent Office Library.)

Johnson, Catholic University of America Biological Series, 29 (1938). (Dept. of Agriculture Library.)